(12) United States Patent
Carboni et al.

(10) Patent No.: US 12,327,101 B2
(45) Date of Patent: Jun. 10, 2025

(54) GENERATING STREAMS OF DISK IMAGE FILES USABLE FOR DEPLOYING SOFTWARE IN COMPUTING ENVIRONMENTS

(71) Applicant: RED HAT, INC., Raleigh, NC (US)

(72) Inventors: Nicholas Carboni, Trenton, NJ (US); Ronnie Lazar, Ra'anana (IL); Avishay Traeger, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 146 days.

(21) Appl. No.: 17/833,044

(22) Filed: Jun. 6, 2022

(65) Prior Publication Data
US 2023/0393828 A1    Dec. 7, 2023

(51) Int. Cl.
*G06F 8/61*    (2018.01)
(52) U.S. Cl.
CPC ........................ *G06F 8/63* (2013.01)
(58) Field of Classification Search
CPC ........................................................ G06F 8/63
See application file for complete search history.

(56) References Cited

U.S. PATENT DOCUMENTS

| | | | |
|---|---|---|---|
| 8,555,076 B2 | 10/2013 | Benedikt | |
| 8,904,081 B1 * | 12/2014 | Kulkarni | G06F 3/0608 718/1 |
| 8,959,322 B2 * | 2/2015 | Mullin | G06F 9/452 718/1 |
| 9,176,744 B2 * | 11/2015 | Lee | G06F 8/658 |
| 10,599,423 B2 * | 3/2020 | Coleman | G06F 8/63 |
| 10,922,118 B2 * | 2/2021 | Luo | G06F 8/63 |
| 11,347,806 B2 * | 5/2022 | Tal | G06F 16/178 |

(Continued)

FOREIGN PATENT DOCUMENTS

| | | | |
|---|---|---|---|
| CN | 101222480 B | 5/2012 | |
| CN | 102591675 A * | 7/2012 | G06F 12/02 |

(Continued)

OTHER PUBLICATIONS

Hu et al., "Difference Expansion Based Reversible Data Hiding Using Two Embedding Directions", Dec. 2008, IEEE, vol. 10, No. 8 (Year: 2008).*

(Continued)

*Primary Examiner* — Wei Y Zhen
*Assistant Examiner* — Junchun Wu
(74) *Attorney, Agent, or Firm* — Kilpatrick Townsend & Stockton LLP

(57) ABSTRACT

Streams of disk image files usable for deploying software in computing environments can be generated according to some examples. In one example, a system can receive, from a client device, a request for a disk image file. The system can determine, based on the request, a base image file and a customized file that are combinable for generating the disk image file. The system can store, in a header of the base image file, characteristics of the disk image file. The system can transmit, to the client device, the base image file as a stream. The system can pause transmission of the base image file based on the characteristics of the disk image file in the header of the base image file. In response to pausing transmission of the base image file, the system can transmit, to the client device, the customized file as the stream.

14 Claims, 3 Drawing Sheets

(56) References Cited

U.S. PATENT DOCUMENTS

| | | | |
|---|---|---|---|
| 2002/0021758 A1* | 2/2002 | Chui | G06T 3/40 |
| | | | 375/240.19 |
| 2005/0018919 A1* | 1/2005 | Shiraishi | H04N 19/91 |
| | | | 382/254 |
| 2007/0186005 A1 | 8/2007 | Setlur et al. | |
| 2009/0292737 A1* | 11/2009 | Hayton | G06F 8/63 |
| 2012/0011270 A1 | 1/2012 | Priddle et al. | |
| 2012/0030473 A1 | 2/2012 | Benedikt | |
| 2012/0297181 A1* | 11/2012 | Lee | G06F 8/658 |
| | | | 713/2 |
| 2013/0219135 A1* | 8/2013 | Knowles | G06F 3/0673 |
| | | | 711/E12.001 |
| 2019/0235861 A1* | 8/2019 | Suarez | G06F 9/45558 |
| 2021/0279072 A1* | 9/2021 | Lee | G06F 8/63 |
| 2023/0229480 A1* | 7/2023 | Warkentin | G06F 8/61 |
| | | | 718/1 |

FOREIGN PATENT DOCUMENTS

| | | | | | |
|---|---|---|---|---|---|
| CN | 107643959 A | * | 1/2018 | | G06F 11/14 |
| CN | 113661478 A | * | 11/2021 | | G06F 21/57 |
| CN | 109165023 B | | 2/2022 | | |
| EP | 3137998 B1 | * | 10/2023 | | G06F 8/63 |
| JP | 2010140403 A | * | 6/2010 | | |
| KR | 100635128 B1 | | 10/2006 | | |

OTHER PUBLICATIONS

Farid et al. "Higher-order Wavelet Statistics and their Application to Digital Forensics", 2003, IEEE (Year: 2003).*

Lin et al., "Using Deduplicating Storage for Efficient Disk Image Deployment", Jun. 2015, Tridentcom (Year: 2015).*

Conti et al., "Visual Reverse Engineering of Binary and Data Files", 2008, Springer-Verlag (Year: 2008).*

"VMware ESXi Installation and Setup," https://docs.vmware.com/en/VMware-vSphere/7.0/com.vmware.esxi.install.doc/GUID-83DB452B-669A-4270-8E0D-B902188376D3.html, 2018-2022, pp. 1-238.

Dittrich, David, "Customizing ISOs and the Honeynet Project's Honeywall," University of Washington, Seattle, WA, Mar. 22, 2004, pp. 30-37.

* cited by examiner

GENERATING STREAMS OF DISK IMAGE FILES USABLE FOR DEPLOYING SOFTWARE IN COMPUTING ENVIRONMENTS

TECHNICAL FIELD

The present disclosure relates generally to disk image files for deploying software in a computing environment. More specifically, but not by way of limitation, this disclosure relates to generating streams of disk image files usable for deploying software in computing environments.

BACKGROUND

Software can be deployed in computing environments using disk image files. A disk image file is generally a static file that includes executable code usable to deploy the software in a computing environment. A disk image file may also include the software's dependencies. Examples of such dependencies can include the operating system, configuration files, packages, and libraries used to run the software. Incorporating the software's dependencies into the disk image files may allow the software to be quickly and easily deployed. In some cases, a disk image file may be a copy of the contents and structure of an entire data storage device.

Disk image files are often configured for deploying their corresponding software inside isolated virtual environments that exist within a larger computing environment. For example, a disk image file may be configured to deploy software inside a container of a computing environment. A container is a relatively isolated virtual environment that can be generated by leveraging resource isolation features (e.g., cgroups and namespaces) of the Linux kernel. A deployment tool such as Docker® can be used to deploy the software inside the container from the disk image file. Deployment of software inside of such containers can be referred to as containerization. As another example, the image file may be configured to deploy the software inside a virtual machine of a computing environment. A deployment tool such as a hypervisor can be used to deploy the software inside the virtual machine from the disk image file.

DETAILED DESCRIPTION

Figure 1:
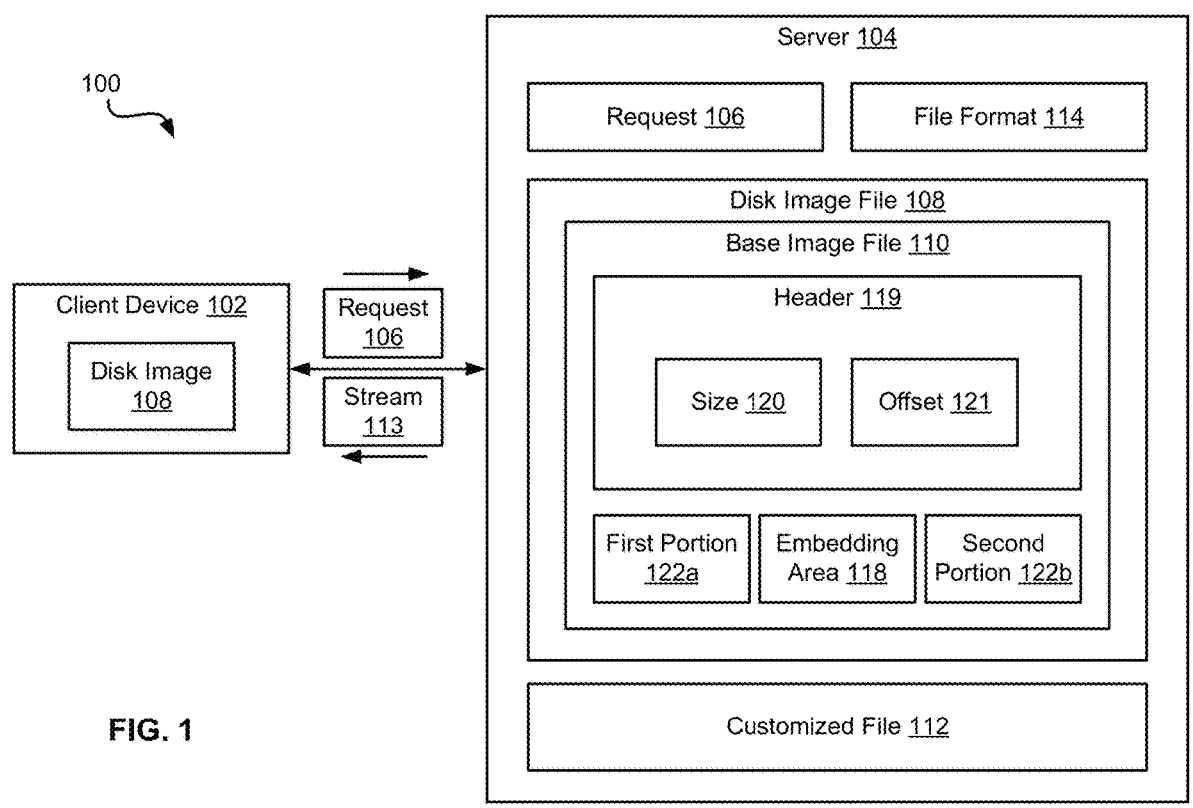
FIG. 1 shows a block diagram of an example of a system for generating streams of disk image files used to deploy software in computing environments according to some aspects of the present disclosure.

One method for accessing disk image files can include downloading a disk image file that is streamed, such as from a server, to the client device. Each disk image file may be customized for the particular client device and user of the client device. Creating a customized disk image file can be computationally expensive and time consuming, even though customized disk image files may be nearly identical to one another, and may only include a small portion of differing customized information. For example, generating a disk image file can involve unpacking the file, inserting custom information, repacking the file, and storing the file before streaming the disk image file to the client device. This may create a significant lag between the time that the client device requested the disk image file and the time that the server can stream the disk image file. After being streamed, the disk image file may be stored for a time in case the disk image file is requested from the client device again. But disk image files can be large and may require significant amounts of server storage space.

Some examples of the present disclosure can overcome one or more of the abovementioned problems by injecting customized files into streams of base image files to generate a stream of a disk image file. A base image file can include a majority of a disk image file, without the customized information requested by a client device. Rather than generating a customized disk image file by unpacking a base image file, inserting a customized file within the base image file to create the disk image file, repacking the disk image, and streaming the disk image file, an unedited base image file can instead be streamed to the client device. At a particular embedding area within the base image file, the stream can be injected with a customized file that includes the customized information requested by the client device. The client device can therefore download a customized disk image file from the stream without first having to wait for a customized disk image file to be generated. By not unpacking base image files, and by not storing large copies of nearly identical customized disk image files, the computing power for, and latency caused by, streaming the disk image files can be reduced.

In one particular example, a client device can transmit a request for a customized disk image file to a server. The server can determine a base image file and a customized file that can be combined to generate the disk image file. The server can additionally determine an embedding area within the base image file in which the customized file can be added to the base image file. For example, the embedding area may be an empty file within the base image file that is a same size as, or larger than, the customized file. In some examples, when the base image file is generated, the header can include a pointer to the empty file. For example, the header may include a size of the embedding area and an offset within the base image file based on the size of the embedding area. Editing the header may not require the base image file to be unpacked or repacked. After determining the embedding area, the server may transmit the base image file to the client device until the embedding area is reached. After determining from the header that the embedding area has been reached, the server can inject the customized file into the stream. After streaming the customized file, a remainder of the base image file, offset by the size of the customized file, can be streamed to the client device. The stream of the base image file, injected with the stream of the customized file, can be identical to a stream of a customized disk image file.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for generating streams 113 of disk image files 108 used to deploy software in computing environments according to some aspects of the present disclosure. The system 100 can include a server 104 that can communicate with a client device 102. Examples of the client device 102 can include a desktop computer or a mobile device (e.g., a smartphone, laptop, or tablet).

The client device 102 may download customized disk image files 108 that are streamed from the server 104. For example, the server 104 may receive a request 106 for a disk image file 108 from the client device 102. Examples of disk image files 108 can include ISO image files, TAR files, or any other files that are stored sequentially. In some examples, the disk image file 108 may be a file that is stored non-sequentially. The server 104 may determine disk image file characteristics of the disk image file 108 based on the request 106. For example, the server 104 may determine that the disk image file 108 has a particular file format 114, such as an ISO image file format. The disk image file characteristics can also include settings, configurations, user credentials, and other characteristics from the request 106 that are specific to the client device 102. The server 104 may determine a base image file 110 and a customized file 112 based on the disk image file characteristics. For example, if the server 104 determines that the client device 102 is requesting an ISO image file for a particular operating system, the server 104 can identify a base image file 110 for the particular operating system in an ISO image file format. The server 104 can determine a customized file 112 that incorporates the additional disk image file characteristics determined from the request 106 from the client device 102.

The base image file 110 may include a header 119 that is editable without requiring the base image file 110 to be unpacked and repacked. When the base image file 110 is generated, the header 119 of the base image file 110 can be updated to include a size 120 and an offset 121 of an embedding area 118 within the base image file 110. The embedding area 118 can be a location at which the customized file 112 can be combined with the base image file 110 to create the disk image file 108. The embedding area 118 can be equal to or greater than the size 120 of the customized file 112. In some examples, the embedding area 118 can be an empty file or empty space within the base image file 110. The base image file 110 can therefore be subdivided into a first portion 122a that precedes the embedding area 118, the embedding area 118, and a second portion 122b that succeeds the embedding area 118.

In some examples, the server 104 can generate the customized file 112 based on the disk image file characteristics. In other examples, the server 104 can determine a particular customized file 112 from a predetermined set of customized files based on the disk image file characteristics. In still further examples, the request 106 from the client device 102 may include the customized file 112. In some examples, the server 104 can determine, based on the disk image file characteristics, that multiple customized files 112 can be combined with a base image file 110 to create the disk image file 108. In such examples, the server 104 can determine multiple embedding areas 118 within the base image file 110 that are each based on a size of one of the customized files 112. In some examples, the embedding area 118 may not be an empty file or an empty portion within the base image file 110, and the server 104 may instead overwrite an existing file or portion within the base image file 110 by injecting the customized file 112 into the stream 113 at such an embedding area 118. The server 104 may determine the embedding area 118 to overwrite based on the request 106 received from the client device 102.

The server 104 can read the header 119 without unpacking the base image file 110. Rather than unpacking the base image file 110, inserting the customized file 112 within the base image file 110 to create the disk image file 108, and repacking the disk image file 108 to stream to the client device 102, the server 104 may transmit the base image file 110 to the client device 102 as a stream 113. The server 104 may stream the base image file 110 until the server 104 determines that an embedding area 118 of the base image file 110 has been reached in the stream 113. For example, the server 104 may transmit a stream 113 of a first portion 112a of the base image file 110 to the client device 102. The server 104 may determine that the embedding area 118 has been reached by reading the size 120 and offset 121 in the header 119 of the base image file 110.

In response to reaching the embedding area 118, the server 104 may pause transmission of the stream 113 of the base image file 110. The server 104 may then transmit the customized file 112 to the client device as the stream 113. After the customized file 112 is streamed, the server 104 can transmit a stream 113 of a remainder of the base image file 110 to the client device 102. For example, the server 104 can transmit the second portion 122b of the base image file 110 to the client device 102, which can be the remainder of the base image file 110 offset by the size 120 of the customized file 112. In this way, the server 104 can generate a stream 113 of a customized disk image file 108, without unpacking and repacking a base image file 110 or storing extra copies of the disk image file 108.

In some examples, the client device 102 may transmit a request 106 for a portion of a customized disk image file 108. Rather than generating the entire disk image file 108 and streaming the portion, the server 104 may determine a portion of a base image file 110 and a portion of a customized file 112 to transmit as a stream 113 to the client device 102. The server 104 can determine a start location and end location of the portion of the base image file 110 that will be streamed to the client device 102. Additionally, the server 104 can determine, from the header 119, if the embedding area 118 is within the start location and end location. The server 104 can then transmit a stream 113 of the portion of the base image file 110, starting at the start location, until the stream 113 reaches the embedding area 118. The server 104 can determine, from the header 119, that the embedding area 118 has been reached, and can inject the portion of the customized file 112 into the stream 113. The server 104 can then transmit the remainder of the portion of the base image file 110 as a stream 113 to the client device 102 until the server 104 determines, from the header 119, that the end location has been reached.

Although FIG. 1 shows a particular number and combination of components, this is intended to be illustrative and non-limiting. Other examples may include more components, fewer components, different components, or a different combination of components than is shown in FIG. 1. For example, although the system 100 includes one client device and one server with base image file, the system 100 may include any number of client devices, servers, or base image files in other examples.

Figure 2:
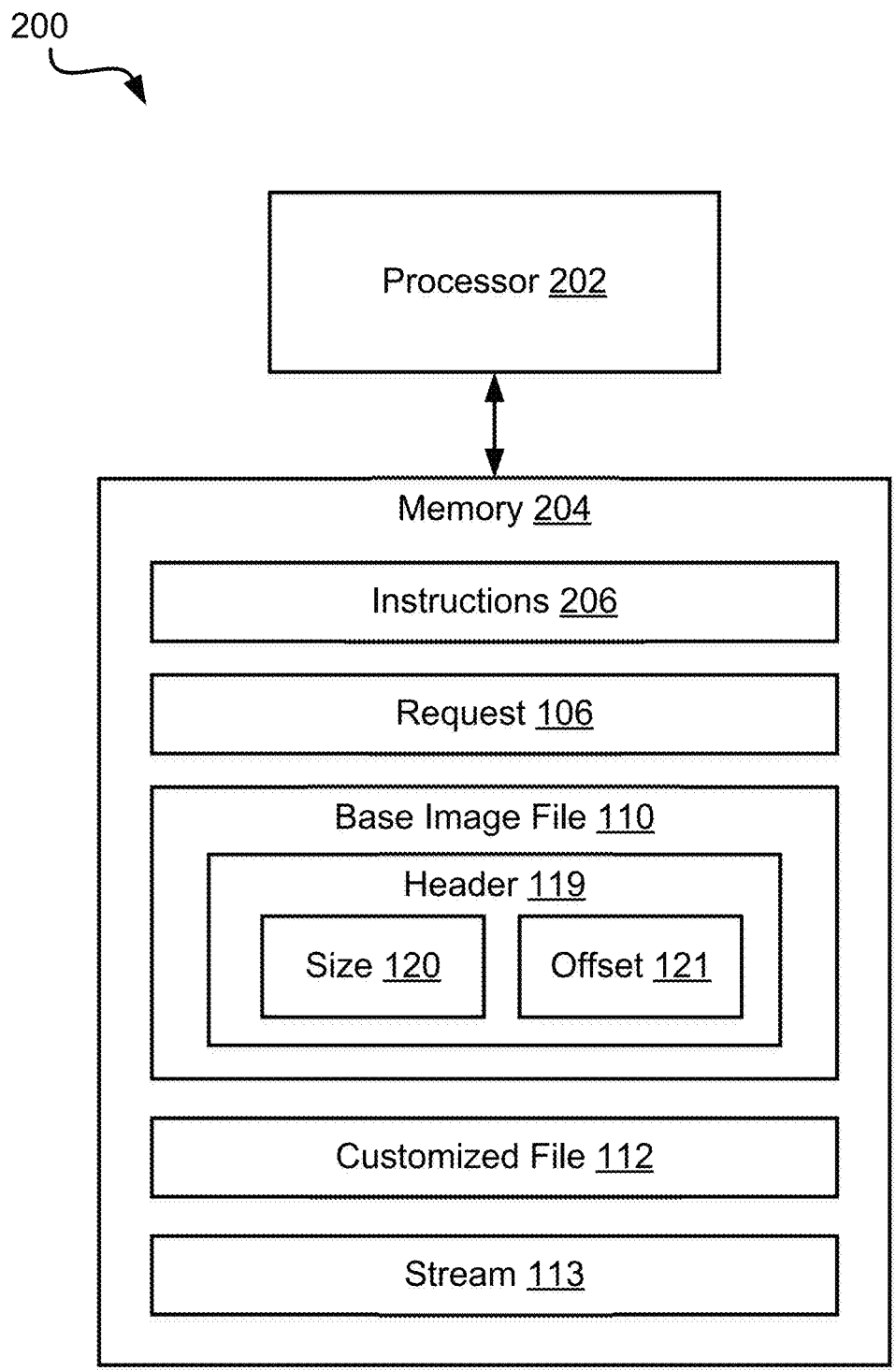
FIG. 2 shows a block diagram of another example of a system for generating streams of disk image files used to deploy software in computing environments according to some aspects of the present disclosure.

FIG. 2 is a block diagram of another example of a system 200 generating streams of disk image files 108 used to deploy software in computing environments according to some aspects of the present disclosure. The system 200 includes a processor 202 that is communicatively coupled to a memory 204. In some examples, the processor 202 and the memory 204 can be part of the same computing device. In other examples, the processor 202 and the memory 204 can be distributed from (e.g., remote to) one another.

The processor 202 can include one processor or multiple processors. Examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C #, and Java.

The memory 204 can include one memory or multiple memories. The memory 204 can be non-volatile and may include any type of memory that retains stored information when powered off. Examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Examples of computer-readable mediums include magnetic disks, memory chips, ROM, random-access memory (RAM), an ASIC, a configured processor, optical storage, or any other medium from which a computer processor can read the instructions 206.

The processor 202 can execute the instructions 206 to generate a stream 113 of a customized disk image file 108 for a client device 102. For example, the processor 202 can receive a request 106 for a disk image file 108 from a client device 102. The processor 202 can determine, based on the request 106, a base image file 110 and a customized file 112 that are combinable for generating the disk image file 108. The processor 202 can determine, from a header 119 of the base image file 110, an embedding area 118 within the base image file 110. The processor 202 can transmit a first portion 122a of the base image file 110 to the client device 102 as a stream 113. The first portion 112a can be a portion of the base image file 110 that precedes the embedding area 118. Subsequent to transmitting the first portion 122a of the base image file 110 as the stream 113, the processor 202 can transmit, to the client device 102, the customized file 112 as the stream 113. Subsequent to transmitting the customized file 112 as the stream 113, the processor 202 can transmit, to the client device 102, a second portion 122b of the base image file 110 as the stream 113 to complete the stream 113 of the entire disk image file 108.

Figure 3:
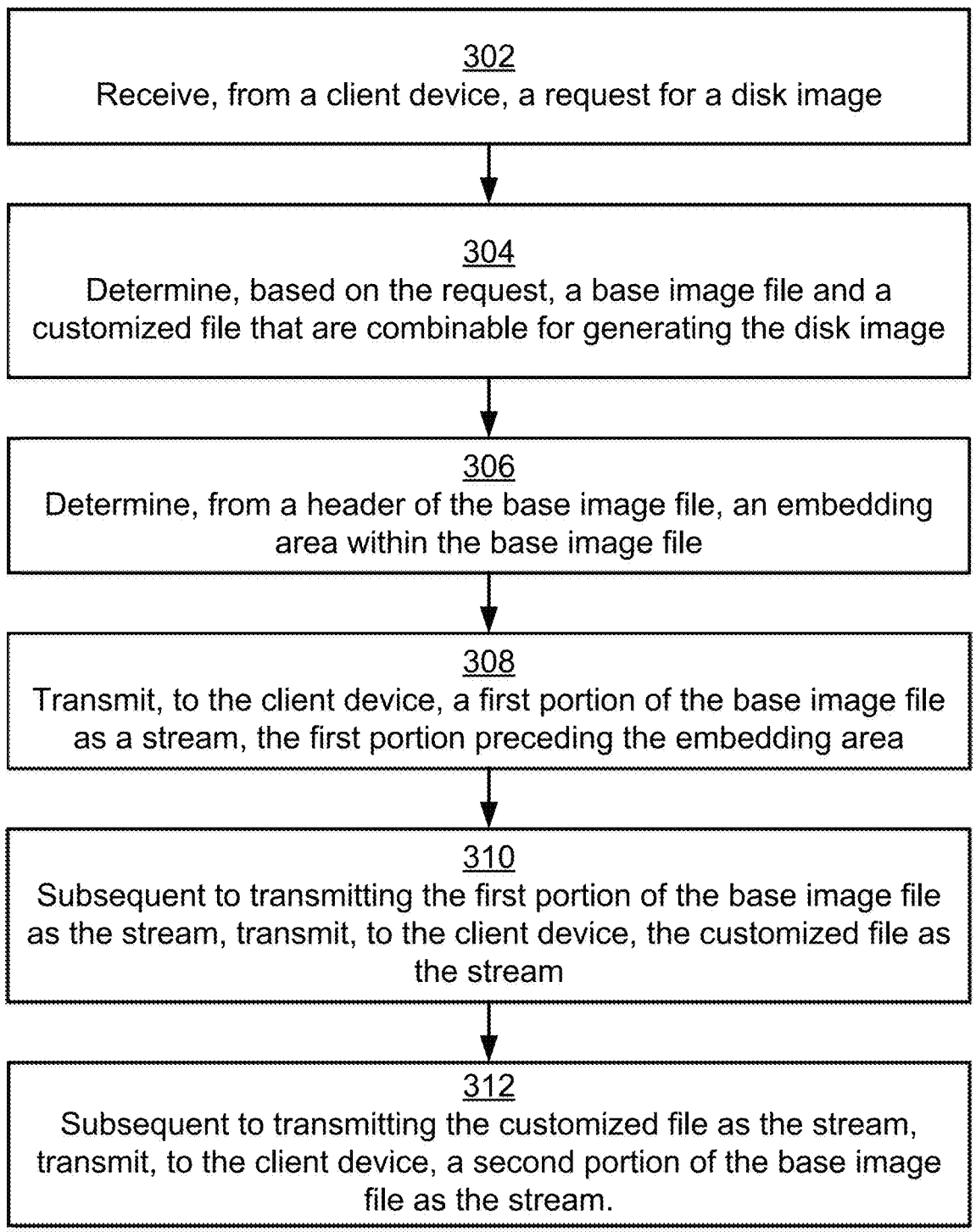
FIG. 3 is a flow chart of an example of a process for generating streams of disk image files used to deploy software in computing environments according to some aspects of the present disclosure.

In some examples, the processor 202 can implement some or all of the steps shown in FIG. 3. Other examples may involve more steps, fewer steps, different steps, or a different order of the steps than is shown in FIG. 3. The steps of FIG. 3 are described below with reference to components described above with regard to FIGS. 1-2.

At block 302, the processor 202 can receive, from a client device 102, a request 106 for a disk image file 108. The request 106 may include customized information regarding the file type, specifications, configurations, and any other personalization required for the disk image file 108. In some examples, the request 106 may include a particular file or portion within a base image file 110 that is to be overwritten with the customized information. At block 304, the processor 202 can determine, based on the request 106, a base image file 110 and a customized file 112 that are combinable for generating the disk image file 108. For example, the processor 202 can determine a file format of the disk image file 108 from the request 106. Based on the file format, the processor 202 can determine the base image file 110 and the customized file 112. The customized file 112 can include all of the customized information requested by the client device 102.

At block 306, the processor 202 can determine, from a header 119 of the base image file 110, an embedding area 118 within the base image file 110. The processor 202 can determine the embedding area 118 based on a size 120 and offset 121 within the header 119. For example, the embedding area 118 may be at least as large as the size 120 of the customized file 112, to ensure that the customized file 112 can be successfully injected into a stream 113 of the base image file 110. In some examples, the embedding area 118 may be an empty file within the base image file 110, or a file within the base image file 110 that can be overwritten. For example, the request 106 from the client device 102 may include an indication of the file within the base image file 110 that can be overwritten by the customized file 112.

At block 308, the processor 202 can transmit, to the client device 102, a first portion 122a of the base image file 110 as a stream 113. The first portion 122a of the base image file 110 can be a portion of the base image file 110 that precedes the embedding area 118. While the base image file 110 is being transmitted in the stream 113, the processor 202 can monitor the stream 113 based on the size 120 and offset 121 in the header 119. At block 310, the processor 202 can transmit, to the client device 102, the customized file 112 as the stream 113 subsequent to transmitting the first portion 122a of the base image file 110 as the stream 113. The processor 202 can determine that the transmission of the stream 113 has reached the embedding area 118 of the base image file 110 by determining, based on the size 120 and the offset 121 in the header 119, that an entirety of the first portion 122a of the base image file 110 has been transmitted.

At block 312, the processor 202 can transmit, to the client device 102, a second portion 122b as the stream 113 subsequent to transmitting the customized file 122 as the stream 113. The second portion 122b of the base image file 110 can be a remainder of the base image file 110 that succeeds the embedding area 118. In other words, the processor 202 can transmit the remainder of the base image file 110, offset by the size 120 of the embedding area 118. The processor 202 can transmit the second portion 122b of the base image file 110 in response to determining that an entirety of the customized file 112 has been transmitted. For example, the processor 202 can determine that the entirety of the customized file 112 has been transmitted by reading the size 120 and offset 121 within the header 119. The entire stream 113 received by the client device 102, including the first portion 122a, the customized file 112 injected into the embedding area 118, and the second portion 122b, can be identical or near identical to a stream of a pre-generated customized disk image file 108 that was unpacked, customized, repacked, and stored before streaming.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
a processor; and
a non-transitory computer-readable memory comprising instructions that are executable by the processor for causing the processor to;
receive, from a client device, a request for a disk image file;
determine, based on the request, a base image file and a customized file that are combinable for generating the disk image file;
determine, from a header of the base image file, an embedding area within the base image file that is a same size or a larger size than the customized file, wherein the header of the base image file comprises a size and an offset of the embedding area;
transmit, to the client device, a first portion of the base image file as a stream, the first portion preceding the embedding area;
pause transmission of the base image file as the stream in response to determining, based on the size and offset, that an entirety of the first portion of the base image file has been transmitted;
subsequent to pausing transmission of the base image file as the stream, transmit, to the client device, the customized file as the stream; and
subsequent to transmitting the customized file as the stream, transmit, to the client device, a second portion of the base image file as the stream in response to determining, based on the size and offset, that the entirety of the customized file has been transmitted, the second portion of the base image file comprising a remainder of the base image file that succeeds the embedding area.

2. The system of claim 1, wherein the memory further comprises instructions that are executable by the processor for causing the processor to determine the embedding area based on an empty portion of the base image file.

3. The system of claim 1, wherein the memory further comprises instructions that are executable by the processor for causing the processor to determine the embedding area by:
determining, from the request, a portion of the base image file to be overwritten with the customized file.

4. The system of claim 1, wherein the memory further comprises instructions that are executable by the processor for causing the processor to:
determine, from the request, a file format of the disk image file; and
determine the base image file and the customized file based on the file format of the disk image file.

5. The system of claim 1, wherein the request comprises a request for a portion of the disk image file, and wherein the memory further comprises instructions that are executable by the processor for causing the processor to:
determine, from the request, a portion of the base image file and a portion of the customized file used to generate the portion of the disk image file; and
determine, based on the header of the base image file, the embedding area within the portion of the base image file.

6. A method comprising:
receiving, by a processor, a request for a disk image file from a client device;
determining, by the processor, a base image file and a customized file that are combinable for generating the disk image file based on the request;
determining, by the processor and from a header of the base image file, an embedding area within the base image file that is a same size or a larger size than the customized file, wherein the header of the base image file comprises a size and an offset of the embedding area;
transmitting, by the processor, a first portion of the base image file as a stream to the client device, the first portion preceding the embedding area;
pausing, by the processor, transmission of the base image file as the stream in response to determining, based on the size and the offset, that an entirety of the first portion of the base image file has been transmitted;
subsequent to pausing transmission of the base image file as the stream, transmitting, by the processor, the customized file as the stream to the client device; and
subsequent to transmitting the customized file as the stream, transmitting, by the processor, a second portion of the base image file as the stream to the client device in response to determining, based on the size and offset, that the entirety of the customized file has been transmitted, the second portion of the base image file comprising a remainder of the base image file that succeeds the embedding area.

7. The method of claim 6, further comprising determining the embedding area based on an empty portion of the base image file.

8. The method of claim 6, wherein determining the embedding area further comprises:
determining, from the request, a portion of the base image file to be overwritten with the customized file.

9. The method of claim 6, further comprising:
determining, from the request, a file format of the disk image file; and
determining the base image file and the customized file based on the file format of the disk image file.

10. The method of claim 6, wherein the request includes a request for a portion of the disk image file, and wherein the method further comprises:
determining, from the request, a portion of the base image file and a portion of the customized file used to generate the portion of the disk image file; and
determining, based on the header of the base image file, the embedding area within the portion of the base image file.

11. A non-transitory computer-readable medium comprising program code that is executable by a processor for causing the processor to:
receive, from a client device, a request for a disk image file;
determine, based on the request, a base image file and a customized file that are combinable for generating the disk image file;
determine, from a header of the base image file, an embedding area within the base image file that is a same size or a larger size than the customized file, wherein the header of the base image file comprises a size and an offset of the embedding area;
transmit, to the client device, a first portion of the base image file as a stream, the first portion preceding the embedding area;
pause transmission of the base image file as the stream in response to determining, based on the size and offset, that an entirety of the first portion of the base image file has been transmitted;

subsequent to pausing transmission of the base image file as the stream, transmit, to the client device, the customized file as the stream; and subsequent to transmitting the customized file as the stream, transmit, to the client device, a second portion of the base image file as the stream in response to determining, based on the size and offset, that the entirety of the customized file has been transmitted, the second portion of the base image file comprising a remainder of the base image file that succeeds the embedding area.

12. The non-transitory computer-readable medium of claim 11, wherein the program code is further executable by the processor for causing the processor to determine the embedding area based on an empty portion of the base image file.

13. The non-transitory computer-readable medium of claim 11, wherein the program code is further executable by the processor for causing the processor to determine the embedding area by:

determining, from the request, a portion of the base image file to be overwritten with the customized file.

14. The non-transitory computer-readable medium of claim 11, wherein the program code is further executable by the processor for causing the processor to:

determine, from the request, a file format of the disk image file; and determine the base image file and the customized file based on the file format of the disk image file.

* * * * *